(12) United States Patent
Wu

(10) Patent No.: US 9,898,631 B2
(45) Date of Patent: Feb. 20, 2018

(54) INTELLIGENT ENERGY MANAGEMENT SYSTEM AND ENERGY MANAGEMENT METHOD FOR PASSIVE RADIO FREQUENCY TAG

(71) Applicants: Excelio Technology (Shenzhen) Co.,Ltd., Shenzhen (CN); Wuxi Excelio Technology CO., Ltd., Wuxi (CN)

(72) Inventor: Patrick Bian Wu, Shenzhen (CN)

(*) Notice: Subject to any disclaimer, the term of this patent is extended or adjusted under 35 U.S.C. 154(b) by 0 days.

(21) Appl. No.: 15/202,546

(22) Filed: Jul. 5, 2016

(65) Prior Publication Data

US 2016/0364587 A1    Dec. 15, 2016

Related U.S. Application Data

(63) Continuation of application No. PCT/CN2015/070144, filed on Jan. 6, 2015.

(30) Foreign Application Priority Data

Jan. 8, 2014 (CN) .......................... 2014 1 0009440

(51) Int. Cl.
*H02M 7/04* (2006.01)
*H02M 1/32* (2007.01)
(Continued)

(52) U.S. Cl.
CPC ..... *G06K 7/10217* (2013.01); *G06K 19/0701* (2013.01); *G06K 19/0712* (2013.01)

(58) Field of Classification Search
CPC . H02M 7/04; H02M 1/32; G06K 7/10; H04B 5/00; H04B 1/59; G08B 23/00
(Continued)

(56) References Cited

U.S. PATENT DOCUMENTS

| 4,818,855 A * | 4/1989 | Mongeon | ............. G06K 7/0008 235/440 |
| 5,889,489 A * | 3/1999 | Friedman | ........... G06K 19/0723 342/51 |

(Continued)

*Primary Examiner* — Nam V Nguyen
(74) *Attorney, Agent, or Firm* — Wayne & Ken, LLC; Tony Hom

(57) ABSTRACT

The present invention relates to an intelligent energy management system and an energy management method for a passive radio frequency tag. Digital conversion is performed on the amplitude of a DC signal absorbed and rectified by an inductance coil antenna of the tag, by providing an intelligent energy management module. The input terminal of the intelligent energy management module is respectively connected to a power supply voltage detection and judgment circuit and a demodulator circuit, and configured to judge the level of charge and enabling state of the tag; and the output terminal thereof is respectively connected to a discharge path, a bias current source and an analog circuit module, and configured to bring the analog circuit module into the optimal operating state according to the enabling state of the tag, or to turn-off/get dormant each analog circuit module thus to reduce power consumption of the tag and improve the sensitivity of the tag. Meanwhile, the intelligent energy management module may further control the discharge path to conduct control on discharge of charge at both ends of the antennas, so that the voltage withstanding performance of devices connected to an inductance coil antenna is reliably ensured.

11 Claims, 12 Drawing Sheets

(51) Int. Cl.
*G06K 7/10* (2006.01)
*H04B 5/00* (2006.01)
*H04B 1/59* (2006.01)
*G08B 23/00* (2006.01)
*G06K 19/07* (2006.01)

(58) Field of Classification Search
USPC ........ 340/10.1–10.5, 572.1, 572.4; 455/41.1, 455/572, 343.5; 342/51, 44
See application file for complete search history.

(56) References Cited

U.S. PATENT DOCUMENTS

| | | | | |
|---|---|---|---|---|
| 6,134,130 A * | 10/2000 | Connell | ............. | G06K 19/0701 363/70 |
| 6,356,198 B1 * | 3/2002 | Wuidart | ........... | G06K 19/07777 235/384 |
| 6,667,914 B2 * | 12/2003 | Gomez | ............. | G06K 19/0723 365/185.27 |
| 6,778,070 B1 * | 8/2004 | Thomas | ............. | G06K 19/0723 340/10.1 |
| 6,859,640 B2 * | 2/2005 | Bardouillet | ........... | G01S 13/758 340/10.34 |
| 6,923,572 B2 * | 8/2005 | Kano | .................... | G01D 9/005 365/191 |
| 7,880,588 B2 * | 2/2011 | Enguent | ............. | G06K 19/0723 235/384 |
| 8,588,682 B2 * | 11/2013 | Wilson | ...................... | G05F 1/46 323/267 |
| 8,754,753 B2 * | 6/2014 | Enguent | ............. | G06K 19/0723 340/10.1 |
| 9,367,784 B2 * | 6/2016 | Tramoni | ........... | G06K 19/0701 |
| 2016/0300086 A1 * | 10/2016 | Lamothe | ................. | G05F 3/262 |
| 2016/0314389 A1 * | 10/2016 | Han | ................... | G06K 19/0709 |
| 2016/0314390 A1 * | 10/2016 | Wu | .................... | G06K 19/0709 |

* cited by examiner

INTELLIGENT ENERGY MANAGEMENT SYSTEM AND ENERGY MANAGEMENT METHOD FOR PASSIVE RADIO FREQUENCY TAG

CROSS-REFERENCE TO RELATED APPLICATIONS

This application is a continuation of International Patent Application No. PCT/CN2015/070144 with a filing date of Jan. 6, 2015, designating the United States, and further claims priority to Chinese Patent Application No. 201410009440.3 with a filing date of Jan. 8, 2014. The content of the aforementioned applications, including any intervening amendments thereto, are incorporated herein by reference.

TECHNICAL FIELD

The present invention belongs to the technical field of radio frequency identification, and particularly to an intelligent energy management system for a passive radio frequency tag and a method for conducting intelligent energy management of the passive radio frequency tag by the intelligent energy management system.

BACKGROUND OF THE PRESENT INVENTION

Passive radio frequency identification (RFID) tags, as they themselves are not designed with any battery, operate relying on electromagnetic energy sent from a card reader. Due to their simple structure and economical practicality, passive RFID tags have been widely applied in the fields of logistics management, asset tracking and mobile healthcare.

When a passive RFID tag operates, it will absorb electromagnetic energy, sent from a card reader, from the surrounding. After absorbing the energy, the passive RFID tag rectifies part of the energy into DC power for powering internal circuits of the passive RFID tag; and the passive RFID tag further inputs the other part of the energy to an internal modulation/demodulator circuit which will demodulate an amplitude modulation signal carried in this energy and send the demodulated signal to a digital baseband portion of the passive RFID tag for processing.

As the distance between the passive RFID tag and the card reader varies, the electromagnetic energy absorbed by the passive RFID tag during operating from the surrounding varies too. When the passive RFID tag is too close to the card reader or the electromagnetic energy sent from the card reader is too high, the strength of a signal received by the passive RFID tag will also be high, so that the voltage sensed on the coil exceeds the voltage-withstanding limit of a transistor for the rectifier module in the chip. As a result, the transistor is damaged permanently, and the RFID tag no longer functions.

The passive RFID tag transmits data to the card reader in a load modulation manner, and the coil at the card reader side acquires the data upon detecting change in the impedance of the coil at the RFID tag side. When the passive RFID tag is too close to the card reader or the electromagnetic energy sent from the card reader is too high, a load modulation signal coupled from the RFID tag side is likely to result in saturation of the receiving end of the card reader, thus to fail the communication. Such failure is more likely to occur in an RTF (Reader Talk First) communication mode where the card reader sends a command first and then waits for a response from the RFID tag.

In order to solve the aforementioned problems of voltage-withstanding reliability and saturation of reception at the card reader, it is required to provide an amplitude limitation processing circuit in the interior of an RFID tag chip circuit, in order to ensure that the voltage across both ends of an antenna on the RFID tag is limited to a predetermined value. The implementation of amplitude limitation may be carried out by a method of leaking current from a rectifier branch to the ground, so that the voltage level output by a rectifier is controlled. The most ideal design requires that a current leakage path may be effectively cut off in the case of an extremely weak field, that is, the current is completely not leaked; and in the case of a gradually enhanced field, the current leakage path may control the starting point of current leakage and the amount of leakage current at any time, so as to achieve the purpose of dynamic adjustment.

SUMMARY OF PRESENT INVENTION

An objective of the present invention is to provide a complete intelligent RFID energy management implementation, by performing digital conversion on the amplitude of DC signals absorbed and rectified by an inductance coil antenna of a passive RFID tag, an intelligent management strategy can play its role adequately in a digital logic control module. This management strategy not only selectively determines the size of a limiting voltage of a limiter circuit during operating, but also intelligently turns off circuit modules, which are not necessary to operate, by digital control logic signals, thus to meet requirements on performances of low power consumption and high sensitivity.

In order to achieve the above objective, the present invention employs the following technical solutions.

An intelligent energy management system for a passive radio frequency tag is provided, including:

a resonant capacitor, which is connected, between a first antenna terminal and a second antenna terminal, in parallel to a resonant inductor, and configured to form a resonant circuit together with the resonant inductor, receive an external electromagnetic field and couple the external electromagnetic field to a rectifier circuit;

a rectifier circuit, the input terminal of which is connected to a first antenna terminal and a second antenna terminal and configured to convert AC power, to which the resonant circuit is coupled, into DC power, the first output terminal of which is output to all analog circuit modules including a demodulator circuit and an intelligent energy management module, the second output terminal of which is output to power supply voltage detection and judgment circuits and configured to provide a judgment voltage to the power supply voltage detection and judgment circuits, the third output terminal of which is grounded by at least two N-type MOS transistors connected in parallel to serve as a discharge path and configured to output charge to the ground when the field intensity is too high;

at least two power supply voltage detection and judgment circuits, the power input terminals of which are connected to the second output terminal of the rectifier circuit, the output terminals of which are connected to the first control input terminal of the intelligent energy management module and configured to generate and then input a logic signal to the intelligent energy management module according to the amount of energy coupled by the first antenna terminal and the second antenna terminal;

a demodulator circuit, the power input terminal of which is connected to the first output terminal of the rectifier circuit, the control input terminal of which is connected between the first antenna terminal and the second antenna terminal, and the output terminal of which is connected to the second control input terminal of the intelligent energy management module and configured to demodulate and then input the enabling state of the tag to the intelligent energy management module according to a voltage signal across both ends of the antennas; and an intelligent energy management module, the power input terminal of which is connected to the first output terminal of the rectifier circuit, the first control input terminal of which is connected to the output terminals of the power supply voltage detection and judgment circuits, the second control input terminal of which is connected to the output terminal of the demodulator circuit, the first control output terminal of which is connected to the control input terminals of at least two discharge paths of the rectifier circuit and configured to control the discharge paths of the rectifier circuit to be opened or closed according to the amount of charge between the first antenna terminal and the second antenna terminal thus to realize controlling the leakage state of the output terminal, and the second control output terminal and the third control output terminal of which are respectively connected to a bias current source and an analog circuit module and configured to control the operating state of the analog circuit module by controlling the amount of a bias current input by the analog circuit module and an enabling/turn-off signal of the analog circuit module. Another objective of the present invention is to provide a passive radio frequency tag including this intelligent energy management system.

Still another objective of the present invention is to provide a method for conducting intelligent energy management of the passive radio frequency tag by the intelligent energy management system. The method for conducting intelligent energy management including the following steps:

a. by a resonant capacitor and a resonant inductor, receiving an external electromagnetic field and then coupling the external electromagnetic field to a rectifier circuit; and by the rectifier circuit, rectifying the AC power into DC power and respectively outputting the DC power to all analog circuit modules including a demodulator circuit and an intelligent energy management module and to the power input terminals of power supply voltage detection and judgment circuits;

b. by the at least two power supply voltage detection and judgment circuits, detecting the value of the DC power, where, since the power supply voltage detection and judgment circuits have different amplitude limiting points, logic signals output by the power supply voltage detection and judgment circuits are also different from each other when the DC power is in different values, and the intelligent energy management module detects the logic signal and thus obtains the level of charge of the tag;

c. by the demodulator circuit, demodulating a command signal of a card reader from antenna terminals and then inputting the command signal to the intelligent energy management module, thus to obtain the enabling state the tag is supposed to be in; and d. connecting the intelligent energy management module to a bias voltage source and an analog circuit module; when an instruction obtained by the intelligent energy management module from the card reader requires the analog circuit module (for example, a bandgap reference voltage module) to be in the operating state and the level of charge of the tag satisfies the operating voltage of the analog circuit module, by the intelligent energy management module, controlling the bias current source to input an appropriate bias current to the analog circuit module to bring the analog circuit module into the optimal operating state; when the instruction obtained by the intelligent energy management module from the card reader requires the analog circuit module to be in the dormant state, by the intelligent energy management module, controlling the bias current source to input an appropriate bias current to the analog circuit module to bring the analog circuit module into the dormant state or bring the bias current source into the OFF state; and meanwhile, setting an output signal of the analog circuit module to zero potential in order to bring the analog circuit module into the FULL-OFF state and thus to reduce the power consumption.

In the intelligent energy management system for a passive radio frequency tag in the present invention, the output terminal of the rectifier circuit is provided with an intelligent energy management module and x power supply voltage detection and judgment circuits, and the discharge paths of the rectifier circuit are provided in parallel with y N-type MOS transistor having different width-to-length ratios. Since the power supply voltage detection and judgment circuits have different amplitude limiting points, as the distance from the passive radio frequency tag to the card reader changes, logic signals output by the power supply voltage detection and judgment circuits are also different from each other when the amount of charge between the first antenna terminal and the second antenna terminal is at different levels of energy, and the intelligent energy management module detects the logic signal and thus obtains the level of charge of the tag. Meanwhile, the intelligent energy management module intelligently controls the operating state of the analog circuit module in each mode, by controlling the bias current source of each analog circuit module and the enabling/turn-off signal of the analog circuit module. For example, the bias current source of an analog circuit module required to be in the operating state is opened and then output into a predetermined value to bring the analog circuit module into the optimal operating state, or an appropriate bias current is input to an analog circuit module which is not necessary to operate to bring the analog circuit module into the dormant state or bring the bias current source into the OFF state; and meanwhile, an output signal of the analog circuit module is set to zero potential in order to bring the analog circuit module into the FULL-OFF state and thus to meet requirements on performances of low power consumption and high sensitivity. Furthermore, the intelligent energy management module timely controls a discharge path, formed of y N-type MOS transistors having different width-to-length ratios connected in parallel, to conduct control on discharge of charge of the antenna terminals, so that the voltage-withstanding performance of devices connected to an inductance coil antenna is reliably ensured.

Another outstanding characteristic of the solution is that implementation of the intelligent energy management module and the x power supply voltage detection and judgment circuits connected in parallel is an ultra-low power consumption implementation, and the typical total current consumption is of a nano-ampere scale ($10^{-9}$). Hence, the whole solution is applicable to passive RFID tag systems.

DESCRIPTION OF THE DRAWINGS

To describe the technical solutions in embodiments of the present invention or in the prior art more clearly, the accompanying drawings to be used for describing the embodiments will be introduced simply. Apparently, the accompanying drawings to be described below merely show some embodiments of the present invention, and those skilled in the art may further obtain other drawings according to these drawings without any creative effort.

DETAILED DESCRIPTION OF PREFERRED EMBODIMENTS

Technical solutions in embodiments of the present invention will be described dearly and completely with reference to the accompanying drawings in the embodiments of the present invention. Apparently, the embodiments to be described are merely some embodiments of the present invention rather than all embodiments of the present invention. Based on the embodiments of the present invention, all other embodiments obtained by those skilled in the art without any creative effort shall fall into the protection scope of the present invention.

Figure 1:
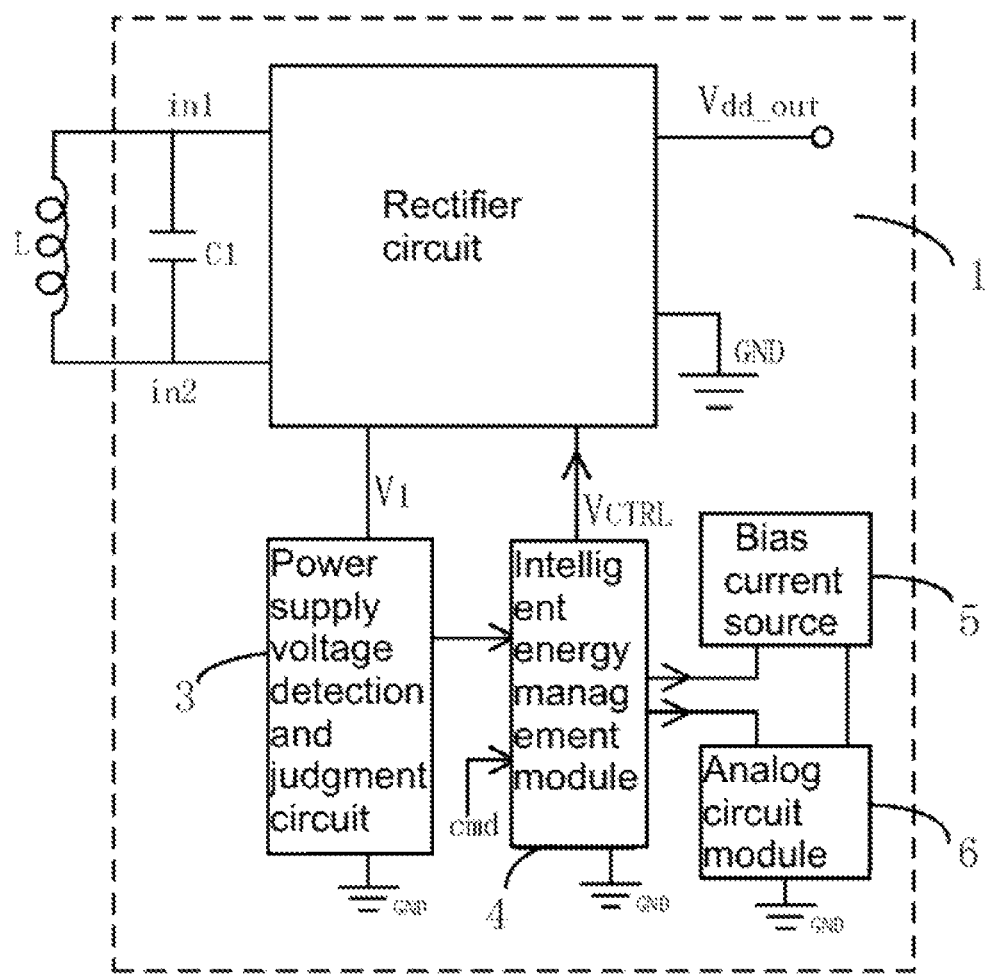
FIG. 1 is a general simplified structure block diagram of a circuit according to the present invention.
Figure 2:
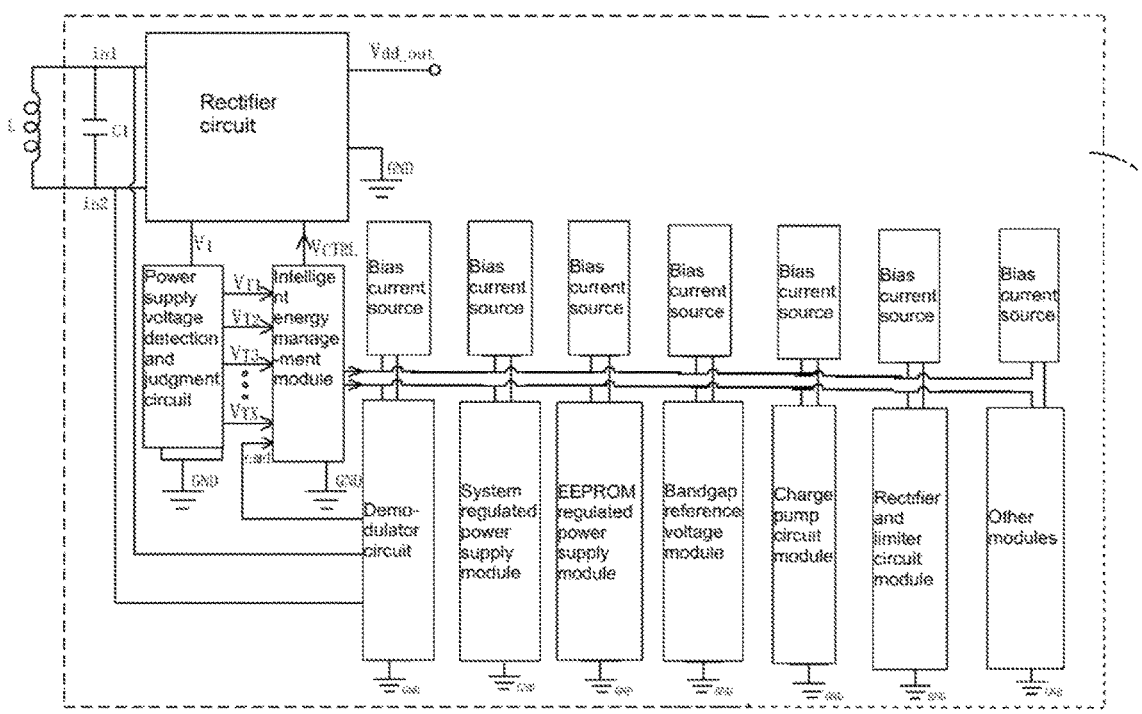
FIG. 2 is a general structure block diagram of the circuit according to the present invention.

FIG. 1 and FIG. 2 are structure block diagrams of a circuit according to the present invention. An intelligent energy management system 1 of the present invention includes:

a resonant capacitor C1, which is connected, between a first antenna terminal in1 and a second antenna terminal in2, in parallel to a resonant inductor L, and configured to form a resonant circuit together with the resonant inductor L, receive an external electromagnetic field and couple the external electromagnetic field to a rectifier circuit;

a rectifier circuit 2, the input terminal of which is connected to a first antenna terminal in1 and a second antenna terminal in2 and configured to convert AC power, to which the resonant circuit is coupled, into DC power, the first output terminal $V_{dd\text{-}out}$ of which is output to all analog circuit modules including a demodulator circuit and an intelligent energy management module 4, the second output terminal V1 of which is output to power supply voltage detection and judgment circuits 3 and configured to provide a judgment voltage to the power supply voltage detection and judgment circuits 3, the third output terminal of which is grounded by at least two N-type MOS transistors connected in parallel to serve as a discharge path and configured to output charge to the ground when the field intensity is too high;

at least two power supply voltage detection and judgment circuits 3, the power input terminals of which are connected to the second output terminal $V_1$ of the rectifier circuit, the output terminals $V_T$ of which are connected to the first control input terminal of the intelligent energy management module 4 and configured to generate and then input a logic signal to the intelligent energy management module 4 according to the amount of energy coupled by the first antenna terminal in1 and the second antenna terminal in2;

a demodulator circuit, the power input terminal of which is connected to the first input terminal $V_{dd\text{-}out}$ of the rectifier circuit 2, the control terminal of which is connected between the first antenna terminal in1 and the second antenna terminal in2, and the output terminal of which is connected to the second control input terminal of the intelligent energy management module 4 and configured to demodulate and then input the enabling state of the tag to the intelligent energy management module 4 according to a voltage signal across both ends of the antennas; and an intelligent energy management module 4, the power input terminal of which is connected to the first output terminal $V_{dd\text{-}out}$ of the rectifier circuit, the first control input terminal of which is connected to the output terminals $V_T$ of the power supply voltage detection and judgment circuits, the second control input terminal of which is connected to the output terminal of the demodulator circuit, the first control output terminal $V_{CTRL}$ of which is connected to the control input terminals of at least two discharge paths of the rectifier circuit and configured to control the discharge paths of the rectifier circuit to be opened or closed according to the amount of charge between the first antenna terminal in1 and the second antenna terminal in2 thus to realize controlling the leakage state of the output terminal, and the second control output terminal and the third control output terminal of which are respectively connected to a bias current source 5 and an analog circuit module 6 and configured to control the operating state of the analog circuit module by controlling the amount of a bias current input by the analog circuit module and an enabling/turn-off signal of the analog circuit module.

Figure 3:
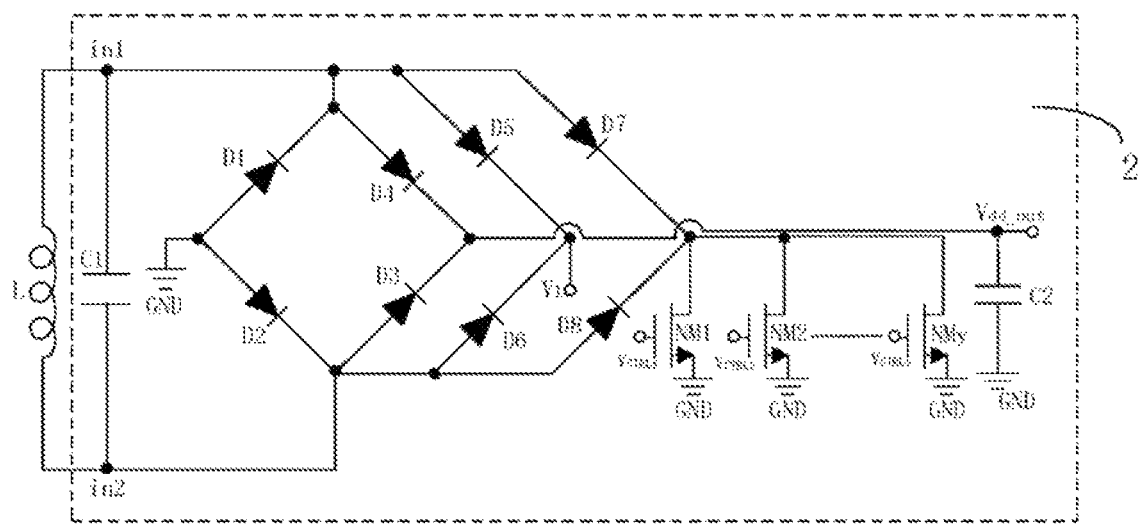
FIG. 3 is a structure diagram of Embodiment 1 of a rectifier circuit according to the present invention.

FIG. 3 is a structure diagram of Embodiment 1 of a rectifier circuit according to the present invention. The rectifier circuit 2 includes a first rectifier branch, a second rectifier branch and a third rectifier branch, which are connected in parallel between the first antenna terminal in1 and the second antenna terminal in2.

The first rectifier circuit branch is a bridge rectifier circuit, one output terminal of which is grounded. The first output terminal $V_{dd\_out}$ thereof is connected to all external load circuits including the demodulator circuit and the intelligent energy management module, and configured to convert AC power, to which the resonant circuit is coupled, into DC power to power the external load circuit.

The second rectifier circuit branch is a fifth diode D5 and a sixth diode D6 connected between the first antenna terminal in1 and the second antenna terminal in2, as shown in FIG. 3. The fifth diode D5 and the sixth diode D6 are configured to convert AC power, to which the resonant circuit is coupled, into DC power and output the DC power to the power input terminals of the power supply voltage detection and judgment circuits 3 from the second output terminal $V_1$ of the rectifier circuit for supplying a judgment voltage to the power supply voltage detection and judgment circuits 3.

Figure 4:
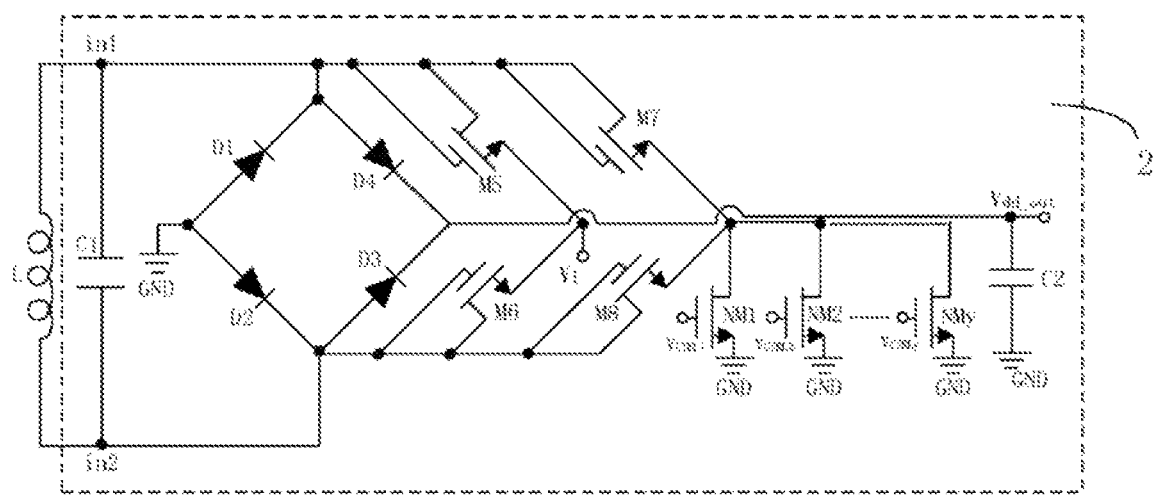
FIG. 4 is a structure diagram of Embodiment 2 of a rectifier circuit according to the present invention.

The structure of a second embodiment of the second rectifier branch is as shown in FIG. 4. In this embodiment, the second rectifier branch is a fifth N-type MOS transistor M5 and a sixth N-type MOS transistor M6 connected between the first antenna terminal in1 and the second antenna terminal in2. The gate and drain of the fifth N-type MOS transistor M5 are respectively coupled to the first antenna terminal in1. The gate and drain of the sixth N-type MOS transistor M6 are respectively coupled to the second antenna terminal in2. The source of the fifth N-type MOS transistor M5 is coupled to the source of the sixth N-type MOS transistor M6, and configured to convert AC power, to which the resonant circuit is coupled, into DC power and output the DC power to the power input terminals of the power supply voltage detection and judgment circuits 3 for supplying a judgment voltage to the power supply voltage detection and judgment circuits 3.

The fifth diode D5 and fifth N-type MOS transistor M5, as well as the sixth diode D6 and the sixth N-type MOS transistor M6 are all one-way conductive electronic elements and configured to rectify AC power between the first antenna terminal in1 and the second antenna terminal in2 into DC power $V_1$. The voltage value of $V_1$ is obtained by subtracting $V_{in1}$ (the AC signal of a positive half cycle) or $V_{in2}$ (the AC signal of a negative half cycle) by the threshold voltage of the diode or MOS transistor.

The third rectifier branch is a seventh diode D7 and an eighth diode D8 connected between the first antenna terminal in1 and the second antenna terminal in2, as shown in FIG. 3. The cathode terminals of the seventh diode D7 and the eighth diode D8 are connected to each other to form the third output terminal of the rectifier circuit. The third output terminal is coupled to the drains of at least two N-type MOS transistors connected in parallel. The gates of the at least two N-type MOS transistors connected in parallel are respectively connected to the first control output terminal $V_{CTRL}$ of the intelligent energy management module 4, and the source of the N-type MOS transistor is grounded and configured to output charge, to which the rectifier circuit is coupled, to the ground when the field intensity is too high, so as to reduce the amount of charge between the first antenna terminal in1 and the second antenna terminal in2.

The structure of a second embodiment of the third rectifier branch is as shown in FIG. 4. In this embodiment, the third rectifier branch is a seventh N-type MOS transistor M7 and an eighth N-type MOS transistor M8 connected between the first antenna terminal in1 and the second antenna terminal in2. The gate and drain of the seventh N-type MOS transistor M7 are respectively coupled to the first antenna terminal in1. The gate and drain of the eighth N-type MOS transistor M8 are respectively coupled to the second antenna terminal in2. The source of the seventh N-type MOS transistor M7 is coupled to the source of the eighth N-type MOS transistor M8 to form a third output terminal of the rectifier circuit. The third output terminal is coupled to the drains of at least two N-type transistors connected in parallel. The gates of the at least two N-type transistors connected in parallel are respectively connected to the first control output terminal $V_{CTRL}$ of the intelligent energy management module 4, and the source of each N-type MOS transistor is grounded and configured to output charge, to which the rectifier circuit is coupled, to the ground when the field intensity is too high, so as to reduce the amount of charge between the first antenna terminal in1 and the second antenna terminal in2.

The seventh diode D7 and the seventh N-type MOS transistor M7, as well as the eighth diode D8 and the eighth N-type MOS transistor M8 are all one-way conductive electronic elements and configured to rectify AC power between the first antenna terminal in1 and the second antenna terminal in2 into DC power and output the DC power to the drain terminals of the at least two N-type MOS transistors connected in parallel.

The one-way conductive electronic elements functioning as rectifying among the first rectifier branch, the second rectifier branch and the third rectifier branch may be a combination of diodes or MOS transistors in any forms, including and not limited to the two combinations as shown in the accompanying drawings, and the enlarging scale of diodes or MOS transistors may be set by adjusting the dimension of the diodes (i.e., the area of PN junction) or adjusting the dimension of channels of the MOS transistors, thereby achieving of the purpose of saving power consumption.

Figure 5:
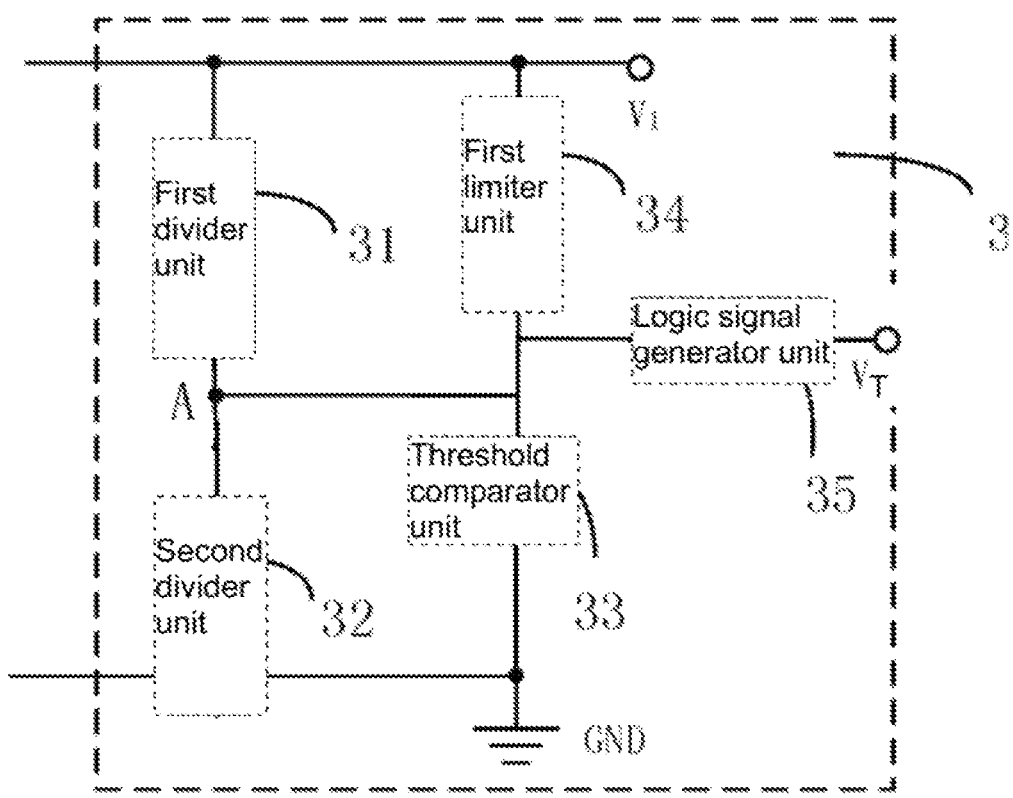
FIG. 5 is a general structure block diagram of a power supply voltage detection and judgment circuit according to the present invention.

FIG. 5 is a general structure block diagram of a power supply voltage detection and judgment circuit according to the present invention. There are at least two power supply voltage detection and judgment circuits 3. Each of the power supply voltage detection and judgment circuits 3 is of a parallel structure connected between the second output terminal $V_1$ of the rectifier circuit and a GND. The output terminals $V_T$ of the power supply voltage detection and judgment circuits 3 are respectively connected to the first control input terminal of the intelligent energy management module 4, and configured to generate and then input logic signals to the intelligent energy management module 4 according to the amount of energy coupled by the first antenna terminal in1 and the second antenna terminal in2.

The power supply voltage detection and judgment circuit 3 includes a first divider unit 31, a second divider unit 32, a threshold comparator unit 33, a first limiter unit 34 and a logic signal generator unit 35. The first divider unit 31 and the second divider unit 32 are successively connected in series between a power terminal $V_1$ and a GND. The control terminal of the threshold comparator unit 33 is connected between the first divider unit 31 and the second divider unit 32, the input terminal thereof is connected to a current source $V_1$ through the first limiter unit 34 and the output terminal thereof is grounded. The input terminal of the logic signal generator unit 35 is connected between the input terminal of the threshold comparator unit 33 and the first limiter unit 34, and configured to generate and then input logic signals to the intelligent energy management module 4.

The first divider unit 31 is any one of at least one resistor, or at least one P-type MOS transistor, or at least one N-type MOS transistor.

Figure 6:
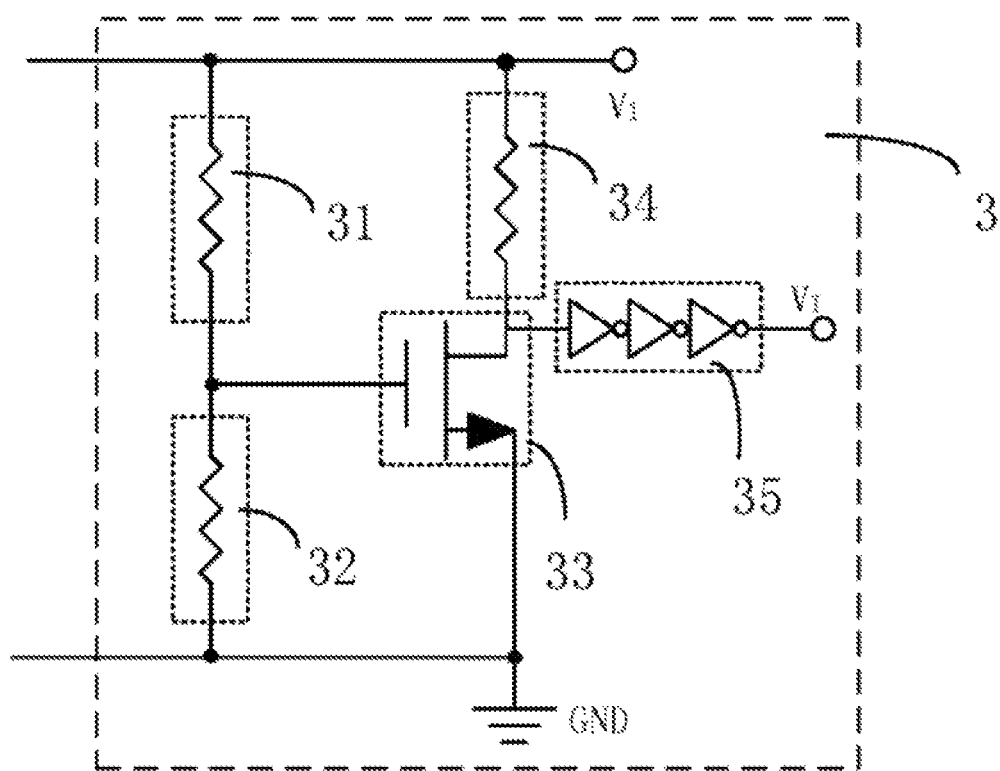
FIG. 6 is a structure diagram of Embodiment 1 of the power supply voltage detection and judgment circuit according to the present invention.

When the first divider unit 31 is at least one resistor, the structure is as shown in FIG. 6. The at least one resistor is in head-to-tail connection to an adjacent resistor to form a serial structure, the first resistor is connected to a power supply $V_1$ to serve as the input terminal of the first divider unit 31, and the last resistor is connected to the second divider unit 32 to serve as the output terminal of the first divider unit 31.

Figure 7:
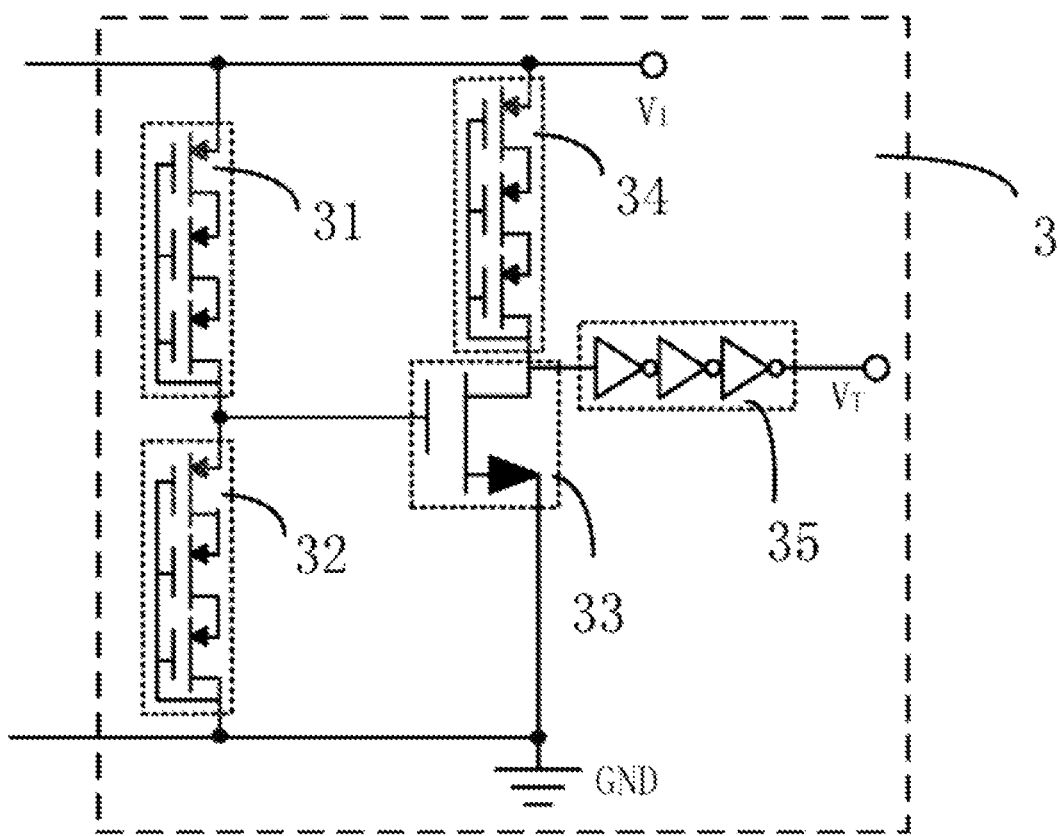
FIG. 7 is a structure diagram of Embodiment 2 of the power supply voltage detection and judgment circuit according to the present invention.

When the first divider unit 31 is at least one P-type MOS transistor, the structure is as shown in FIG. 7. The drain terminal of the at least one P-type MOS transistor is connected to the source terminal of an adjacent P-type MOS transistor to form a serial structure, the source of the first P-type MOS transistor is connected to the power supply $V_1$ to serve as the input terminal of the first divider unit 31, the drain of the last P-type MOS transistor is connected to the second divider unit 32 to serve as the output terminal of the first divider unit 31, and the gate of each P-type MOS transistor is connected to the drain of the last P-type MOS transistor.

Figure 8:
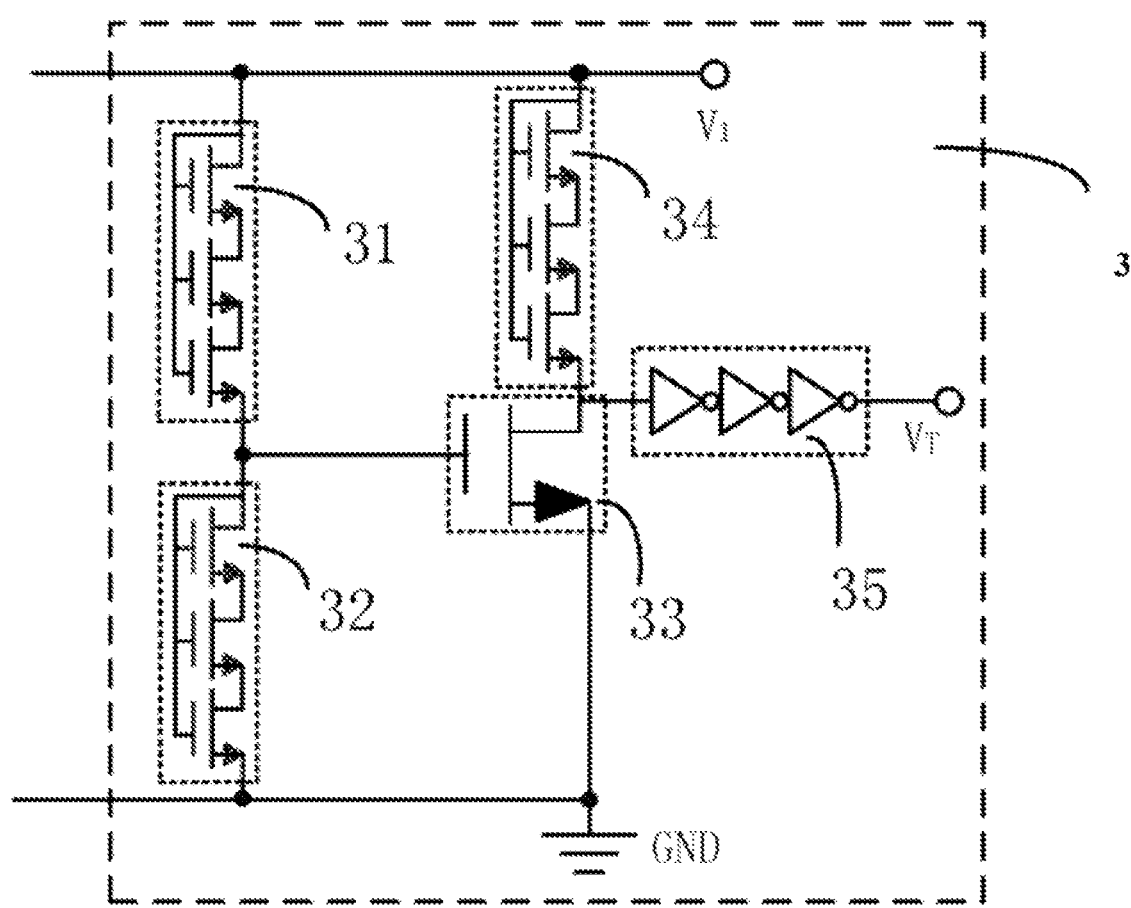
FIG. 8 is a structure diagram of Embodiment 3 of the power supply voltage detection and judgment circuit according to the present invention.
Figure 9:
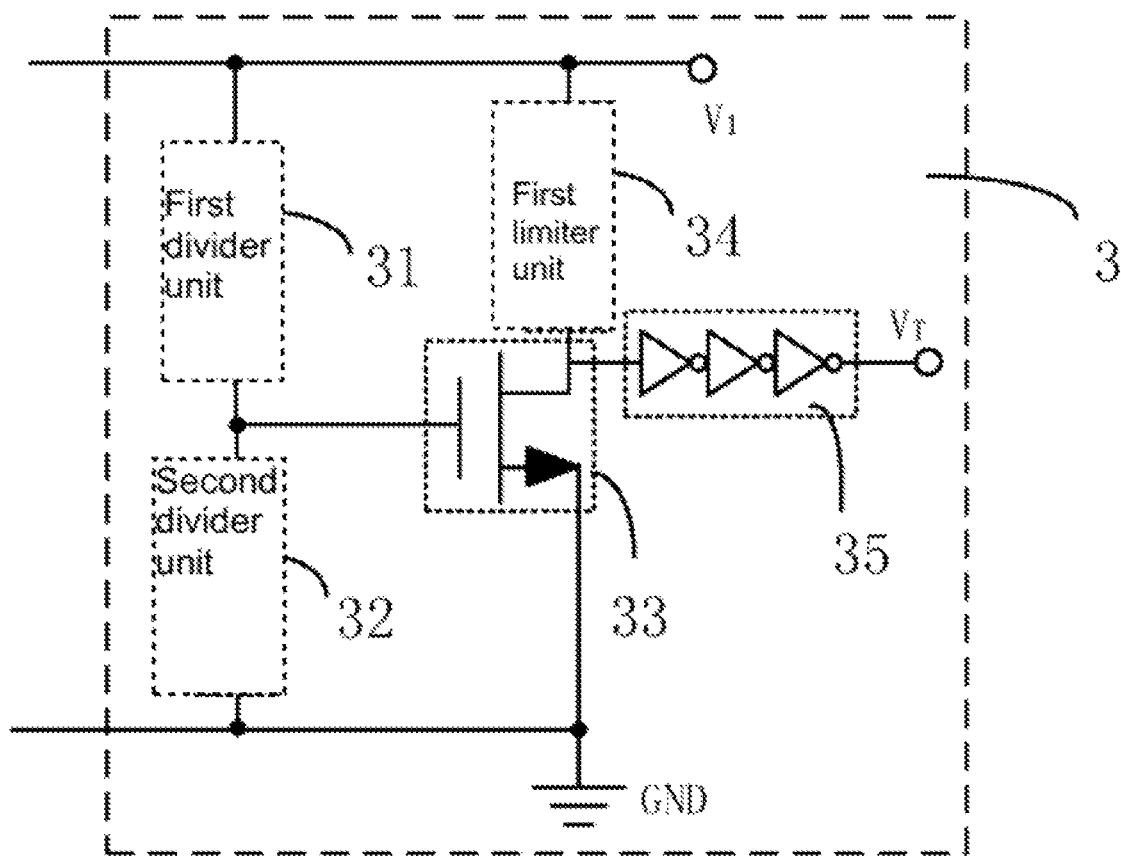
FIG. 9 is a structure diagram of Embodiment 4 of the power supply voltage detection and judgment circuit according to the present invention.

When the first divider unit 31 is at least one N-type MOS transistor, the structure is as shown in FIG. 8. The source terminal of the at least one N-type MOS transistor is connected to the drain terminal of an adjacent N-type MOS transistor to form a serial structure, the drain of the first N-type MOS transistor is connected to the power supply $V_1$ to serve as the input terminal of the first divider unit 31, the source of the last N-type MOS transistor is connected to the second divider unit 32 to serve as the output terminal of the first divider unit 31, and the gate of each N-type MOS transistor is connected to the drain of the first N-type MOS transistor.

The second divider unit 32 is any one of at least one resistor, or at least one P-type MOS transistor, or at least one N-type MOS transistor.

When the second divider unit 32 is at least one resistor, the structure is as shown in FIG. 6. The at least one resistor is in head-to-tail connection to an adjacent resistor to form a serial structure, the first resistor is connected to the first divider unit 31 to serve as the input terminal of the first divider unit 32, and the last resistor is grounded to serve as the output terminal of the second divider unit 32.

When the second divider unit 32 is at least one P-type MOS transistor, the structure is as shown in FIG. 7. The drain terminal of the at least one P-type MOS transistor is connected to the source terminal of an adjacent P-type MOS transistor to form a serial structure, the source of the first P-type MOS transistor is connected to the first divider unit 31 to serve as the input terminal of the second divider unit 32, the drain of the last P-type MOS transistor is grounded to serve as the output terminal of the second divider unit 32, and the gate of each P-type MOS transistor is connected to the drain of the last P-type MOS transistor.

When the second divider unit 32 is at least one N-type MOS transistor, the structure is as shown in FIG. 8. The source terminal of the at least one N-type MOS transistor is connected to the drain terminal of an adjacent N-type MOS transistor to form a serial structure, the drain of the first N-type MOS transistor is connected to the first divider unit 31 to serve as the input terminal of the second divider unit 32, the source of the last N-type MOS transistor is grounded to serve as the output terminal of the second divider unit 32, and the gate of each N-type MOS transistor is connected to the drain of the first N-type MOS transistor.

The first limiter unit 34 is any one of at least one resistor, or at least one P-type MOS transistor, or at least one N-type MOS transistor.

When the first limiter unit 34 is at least one resistor, the structure is as shown in FIG. 6. The at least one resistor is in head-to-tail connection to an adjacent resistor to form a serial structure, the first resistor is connected to a power supply $V_1$ to serve as the input terminal of the first limiter unit 34, and the last resistor is connected to the threshold comparator unit 33 to serve as the output terminal of the first limiter unit 34.

When the first limiter unit 34 is at least one P-type MOS transistor, the structure is as shown in FIG. 7. The drain terminal of the at least one P-type MOS transistor is connected to the source terminal of an adjacent P-type MOS transistor to form a serial structure, the source of the first P-type MOS transistor is connected to the power supply $V_1$ to serve as the input terminal of the first limiter unit 34, the drain of the last P-type MOS transistor is connected to the threshold comparator unit 33 to serve as the output terminal of the first limiter unit 31, and the gate of each P-type MOS transistor is connected to the drain of the last P-type MOS transistor.

When the first limiter unit 34 is at least one N-type MOS transistor, the structure is as shown in FIG. 8. The source terminal of the at least one N-type MOS transistor is connected to the drain terminal of an adjacent N-type MOS transistor to form a serial structure, the drain of the first N-type MOS transistor is connected to the power supply $V_1$ to serve as the input terminal of the first limiter unit 34, the source of the last N-type MOS transistor is connected to the threshold comparator unit 33 to serve as the output terminal of the first limiter unit 34, and the gate of each N-type MOS transistor is connected to the drain of the first N-type MOS transistor.

The first divider unit, the second divider unit and the first limiter unit may be separately formed by connecting in series one or more resistors, MOS transistors or other impedance elements. Meanwhile, in each embodiment, the impedance elements used in the first divider unit, the second divider unit and the first limiter unit do not have to be symmetrical, and any one or more impedance elements in each unit may also be connected in series. Due to longer channel dimension and higher resistance, the plurality of MOS transistors connected in series have better impedance characteristics, and their area is mush smaller than the resistor having the same impedance. Therefore, the preferred embodiments of the present invention employ a serial structure having a plurality of MOS transistors connected in series.

The threshold comparator unit 33 is at least one N-type MOS transistor, the structure of which is as shown in FIG. 6 to FIG. 9. The gate of the N-type MOS transistor is connected between the first divider unit 31 and the second divider unit 32 to serve as the control terminal of the threshold comparator unit 33, the drain thereof is connected to the current source $V_1$ through the first limiter unit 34 to serve as the input terminal of the threshold comparator unit 33, and the source thereof is grounded to serve as the output terminal of the threshold comparator unit 33.

Figure 10:
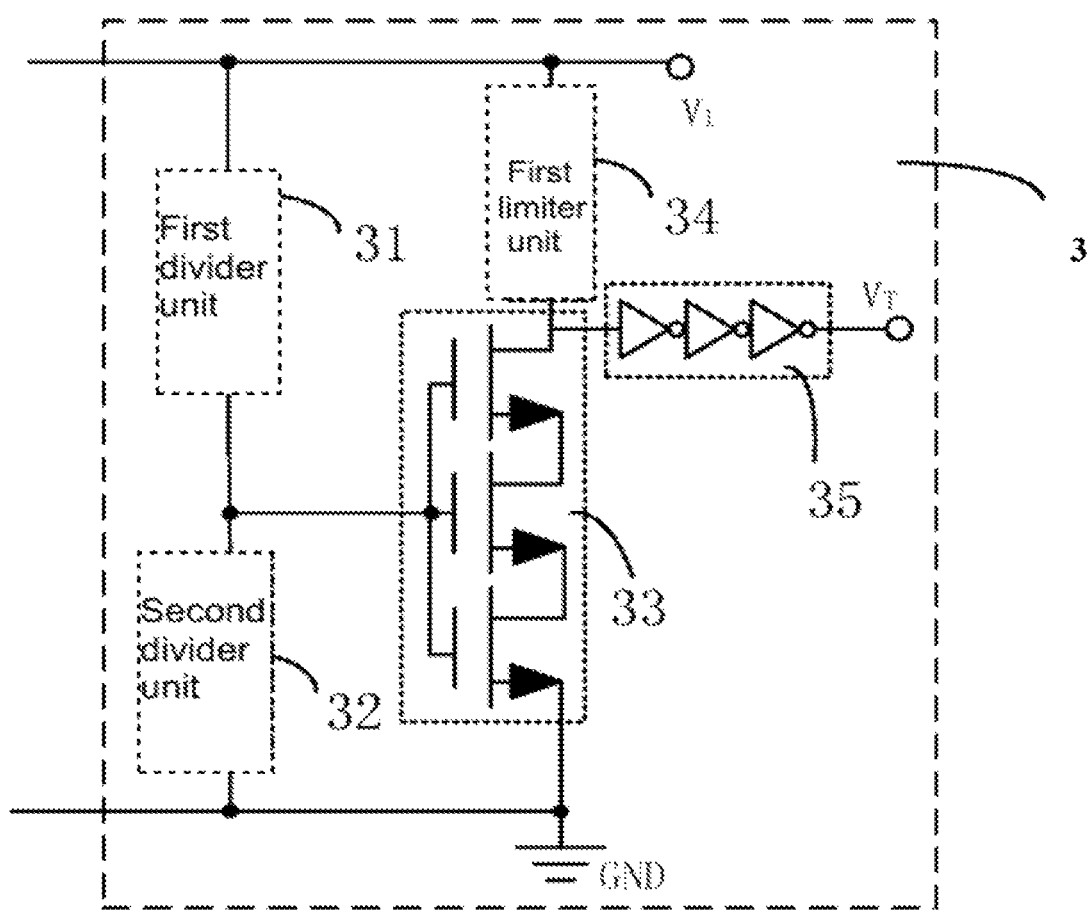
FIG. 10 is a structure diagram of Embodiment 5 of the power supply voltage detection and judgment circuit according to the present invention.

Similarly, the threshold comparator unit 33 in the present invention may also be formed of two or more N-type MOS transistors connected in series. The source terminal of each N-type MOS transistor is connected to the drain terminal of an adjacent N-type MOS transistor to form a serial structure, the drain of the first N-type MOS transistor is connected to the current source $V_1$ through the first limiter unit 34 to serve as the input terminal of the threshold comparator unit 33, the source thereof is grounded to serve as the output terminal of the threshold comparator unit 33, and the gate of each N-type MOS transistor is connected between the first divider unit 31 and the second divider unit 32 to serve as the control terminal of the threshold comparator unit 33, as shown in FIG. 10. With such a structure formed of a plurality of N-type MOS transistors connected in series, the channel dimension of the MOS transistors is lengthened and the width-to-length ratio becomes smaller, so that the turnover time constant of the MOS transistors may become larger and the turnover speed of the threshold unit is delayed, thereby achieving the purpose of reducing ripples of the output power supply. Meanwhile, as the channel dimension of the MOS transistors becomes larger, the resistance is increased, so that the effect of reducing power consumption and limiting current may be realized.

Figure 11:
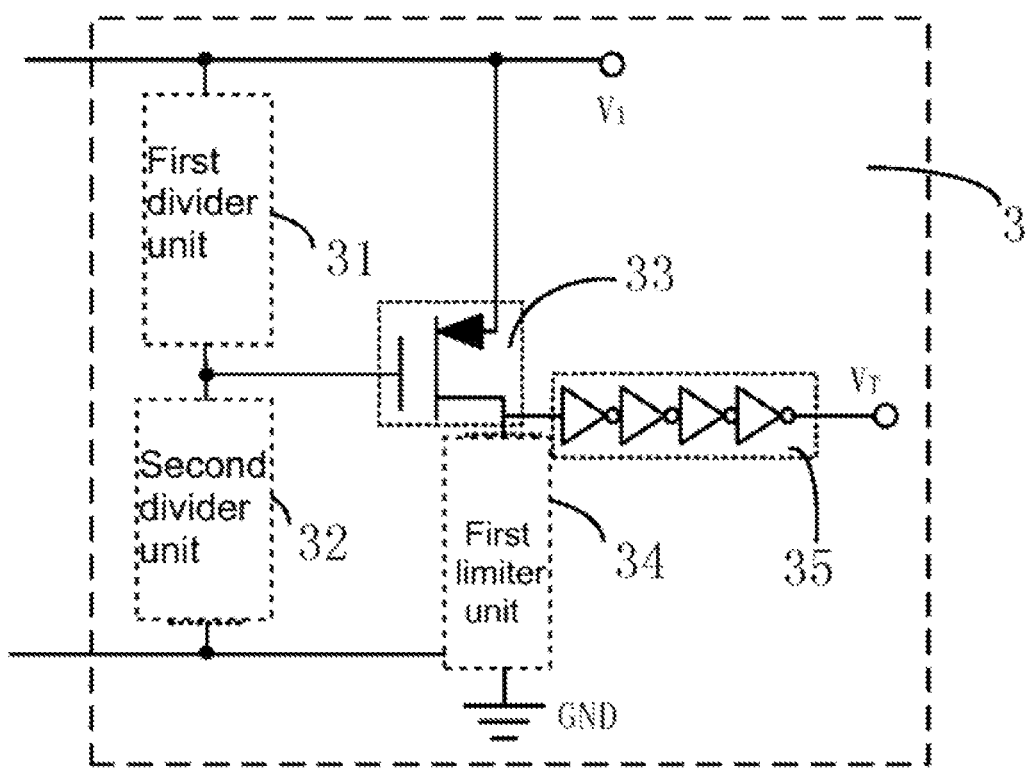
FIG. 11 is a structure diagram of Embodiment 6 of the power supply voltage detection and judgment circuit according to the present invention.

When the threshold comparator unit 33 is a P-type MOS transistor, the structure is as shown in FIG. 11. The gate of the P-type MOS transistor is connected between the first divider unit 31 and the second divider unit 32 to serve as the control terminal of the threshold comparator unit 33, the source thereof is connected to the current source $V_1$ to serve as the input terminal of the threshold comparator unit 33, and the drain thereof is grounded through the first limiter unit 34 to serve as the output terminal of the threshold comparator unit 33.

Similarly, the threshold comparator unit in the present invention may also employ a structure of a plurality of P-type MOS transistors instead of the structure of a single P-type MOS transistor as in FIG. 11, and the connection structure and principle will not be repeated here.

The logic signal generator unit 35 refers to an odd number of inverters connected in series (when the threshold comparator unit is a P-type MOS transistor, there are an even number of inverters connected in series in the logic signal generator unit). The input stage of the first inverter is connected between the threshold comparator unit and the first limiter unit to serve as the input terminal of the logic signal generator unit, and the output stage $V_T$ of the last inverter is connected to the first control input terminal of the intelligent energy management module 4 and configured to generate and then input logic signals to the intelligent energy management module according to the amount of energy coupled by the first antenna terminal in1 and the second antenna terminal in2.

The technical solutions disclosed by the present invention may be expressed as follows: a rectifier of a radio frequency identification tag converts a DC voltage $V_1$ from electromagnetic field energy in the surrounding, and the voltage $V_1$ is input to power supply voltage detection and judgment circuits 3. Assumed that the impedance of the first divider unit is $R_1$ and the impedance of the second divider unit is $R_2$, then the current value of the first and second divider unit branches is:

$$I=V_1/(R_1+R_2).$$

The voltage value at point A is:

$$V_A=V_1 \cdot R_2/(R_1+R_2).$$

As such, the voltage value at the control terminal of the threshold comparator unit is:

$$V_{GS}=V_A=V_1 \cdot R_2/(R_1+R_2).$$

It can be seen from the above formulae that, in the case where the voltage value $V_1$ across two ends of the power supply voltage detection and judgment circuits connected in parallel is identical, the voltage value at the control terminal of the threshold comparator unit may be controlled by setting an impedance ratio of the first and second divider units, thereby achieving the purpose of controlling the amplitude limiting point of each power supply voltage detection and judgment circuit.

As an implementation, if $V_1$ is set as 3V, and if it is assumed that the impedance ratio ($R_1:R_2$) of the first and second divider units in the first power supply voltage detection and judgment circuit is equal to 1:1, then $V_{GS}=V_A=1.5V$, which is higher than the threshold ON voltage (0.7V) of the threshold comparator unit, so that the threshold comparator unit of this power supply voltage detection and judgment circuit is turned on and outputs a low-level signal to the logic signal generator unit. Then, an odd number of inverters connected in series in the logic signal generator unit output this low-level signal as 1 indicative of a high-level logic signal, and input this high-level logic signal $V_{T1}$ to the intelligent energy management module 4.

Similarly, assumed that the impedance ratio ($R_1:R_2$) of the first and second divider units in the second power supply voltage detection and judgment circuit is equal to 1:2, then $V_{GS}=V_A=2V$, which is higher than the threshold ON voltage (0.7V) of the threshold comparator unit, so that the threshold comparator unit of this power supply voltage detection and judgment circuit is also turned on and generates 1 indicative of a high-level logic signal, and input this high-level logic signal $V_{T2}$ to the intelligent energy management module 4.

Assumed that the impedance ratio ($R_1:R_2$) of the first and second divider units in the $x^{th}$ power supply voltage detection and judgment circuit is equal to 4:1, then $V_{GS}=V_A=0.6V$, which is lower than the threshold ON voltage (0.7V) of the threshold comparator unit, so that the threshold comparator unit is cut off, and the logic signal generator unit outputs 0 indicative of a low-level logic signal. The low-level logic signal $V_{Tx}$ is input to the intelligent energy management module 4.

As one embodiment of the present invention, the energy of the passive radio frequency identification tag in the present invention is classified into several levels according to several typical operating states thereof:

1. Beginning with the simplest TIF (Tag-Talk First) mode where a passive RFID tag responds initiatively. In this mode, only the least circuit modules are operating, including a modulator for transmitting, a clock recovery circuit for supplying clock signals and a rectifier for supplying energy, the energy level should be hence lowest. For example, in a CMOS process of 0.18 µm, the system may operate as long as the voltage of the DC power output by the rectifier reaches 1.5V. The competitiveness of products depends upon whether the whole system may enter a normal operating state in the lowest energy level, i.e., the sensitivity of the passive RFID tag. This is the first energy level of the passive radio frequency tag.

2. The energy demand of the tag grows into a higher level when a card reader sends a command instruction to the passive RFID tag. In this mode, the demodulator circuit of the system needs to correctly parse the command sent by the card reader. As energy required by the system can not be provided limitlessly due to the limited energy-storage capacitors of the chip, the circuit modules in this mode may enter a correct operating state only when the voltage of DC power output by the rectifier reaches about 2.0V. This is the second energy level of the passive radio frequency tag.

3. If the command sent by the card reader contains an instruction of reading specific data from a memory built-in the chip, for example, an EEPROM memory, the energy demand of the passive RFID tag grows into a next higher level. In order to correctly read data from the EEPROM, the power supply voltage is to be relatively stably set at 2.0V. Therefore, a low-voltage-difference regulated power supply having an output of 2.0V and a bandgap reference voltage generator module required to form the low-voltage-difference regulated power supply must enter the correct operating state. Further, in order to read date from a plurality of addresses, it is required to monitor the energy level which may change constantly, an operation of continuously reading data from EEPROM may be executed successfully only when a monitor signal indicates that the energy level required to read continuously is satisfied. Hence, a read enabling module, monitoring the power supply of 2.0V, in the system needs to operate in this mode. As more modules enter the operating state, it is required to charge the limited energy-storage capacitors by the rectifier to a higher voltage, for example, 2.5V to 3.5V, to support the energy demand in this mode. The classified third energy level of the technology is thus formed.

4. The chip has to supply a high voltage of 17V, which is necessary for erasing and programming, to the floating gate control terminal of the EEPROM during erasing and programming the EEPROM built in the chip. This high voltage is to be generated by exciting a charge pump circuit by a built-in oscillator circuit. On the basis of the previous energy level, both the high-frequency oscillator circuit and the charge pump circuit require additional power consumption. In this case, a typical example of energy demand is that the rectifier outputs a DC voltage of 5V. This is the fourth energy level of the passive radio frequency tag.

5. The output by the rectifier, which exceeds the energy level of a voltage of more than 7V, threatens the reliability of voltage withstanding performance of certain critical transistors in the circuit. Hence, the energy management module sets the energy level corresponding to the voltage of more than 7V output by the rectifier as an energy limit. This is the fifth energy level of the passive radio frequency tag.

Corresponding to the five classified different energy levels, in this embodiment, there are four power supply voltage detection and judgment circuits connected in parallel between the power output terminal $V_1$ of the rectifier circuit and the GND, and an impedance ratio of the first divider unit and the second divider unit of the four power supply voltage detection and judgment circuits is respectively set as 1:1, 2:1, 4:1 and 9:1. In this way, $V_{T1}$, $V_{T2}$, $V_{T3}$ and $V_{T4}$ are respectively 0, 0, 0 and 0, when the $V_1$ is smaller than 1.4V (not including 1.4V), and hence, the intelligent energy management module may determine that the level of charge of the tag is in the first energy level; $V_{T1}$, $V_{T2}$, $V_{T3}$ and $V_{T4}$ are respectively 1, 0, 0 and 0, when the $V_1$ is smaller than 1.4V (not including 2.1V), and hence, the intelligent energy management module may determine that the level of charge of the tag is in the first energy level; $V_{T1}$, $V_{T2}$, $V_{T3}$ and $V_{T4}$ are respectively 1, 1, 0 and 0 when the $V_1$ is 2.1V to 3.5V (not including 3.5V), and hence, the intelligent energy management module may determine that the level of charge of the tag is in the second energy level; $V_{T1}$, $V_{T2}$, $V_{T3}$ and $V_{T4}$ are respectively 1, 1, 1 and 0 when the $V_1$ is 3.5V to 7V (not including 7V), and hence, the intelligent energy management module may determine that the level of charge of the tag is in the fourth energy level; and $V_{T1}$, $V_{T2}$, $V_{T3}$ and $V_{T4}$ are respectively 1, 1, 1 and 1 when the $V_1$ is greater than 7V, and hence, the intelligent energy management module may determine that the level of charge of the tag is in a state higher than the fourth energy level.

All analog circuit modules in the chip system of the passive radio frequency tag into at least two largest state classes, i.e., an application mode state and a dormant (OFF) mode state, by an intelligent energy management strategy. Brining some analog circuit modules into the dormant state initiatively in a corresponding mode is critical for the technology to achieve lower power consumption with competitiveness. By the design of using enabling/turn-off logic signals as a control mechanism, the analog circuit which enters the dormant state employs the following two circuit processing methods:

1. Setting all bias current sources to the OFF state. For example, for a current source formed of N-type MOS transistors, one switching NMOS transistor is spanned between the gates of the NMOS transistors of the current source and the GND. When the switching NMOS transistor receives signals indicative of entering the dormant state, the channel of the switching NMOS transistor is turned on, the voltage of the gate of the NMOS transistors of the current source is pulled down to the ground, so that the NMOS transistors of the current source is turned off. For a current source formed of P-type MOS transistors, one switching PMOS transistor is spanned between the gate of the PMOS transistors of the current source and a power line. When the switching PMOS transistor receives signals indicative of entering the dormant state (the signals are reversed, i.e., low active), the channel of the switching PMOS transistor is turned on, the voltage of the gate of the PMOS transistors of the current source is pulled up to the power line, so that the PMOS transistors of the current source are turned off.

2. Setting an output signal of the analog circuit module to zero potential. In a case where the current source is biased and turned off, the output of some analog circuit modules is in a state where they are not driven and is thus required to be reliably set to zero potential to avoid unpredictable circuit states. For example, when the regulated power supply is in the dormant state, the output of the low-voltage-difference regulated power supply is to be pulled down initiatively to the zero potential by the switching MOS transistor; the output of the bandgap reference voltage module supplies a reference voltage which will not drift with temperature and process in the whole chip, and once the bandgap reference voltage module is in the dormant state with low power consumption and other modules of the chip system do not need the bandgap reference, the output of the bandgap reference voltage is pulled down initiatively by one switching MOS transistor initiatively. In a state where it does not need to parse a command sent by the card reader, the output of the demodulator circuit in the chip system can not be in a state where it is not driven thus to send a random signal, and hence, in a case where the current source is biased and turned off, the signal output terminal of the demodulator itself is to be pulled down initiatively to the zero potential by one switching MOS transistor. In a state where it does not need to read data from the EEPROM, for the reading voltage detection and judgment circuit module related to the operation of the EEPROM, the output of the reading voltage regulated power supply module is to be pulled down initiatively to the zero potential by one switching MOS transistor. In a state where it does not need to erase data from the EEPROM or write data into the EEPROM, the output of the high-frequency oscillator and charge pump circuit modules related to erasing data from the EEPROM is to be pulled down initiatively to the zero potential by one switching MOS transistor, or otherwise, the power consumption can not be reduced.

The design of respectively controlling the enabling/turn-off signals, output by the bias current source and the analog circuit module, by the intelligent energy management module by the intelligent energy management strategy brings each analog circuit module, in a corresponding mode, into the dormant state with low power consumption, thereby improving the sensitivity of the tag chip.

As mentioned above, the bias current source is brought into two limit states, i.e., completely opened or in short circuit, so that a corresponding analog circuit module operates or gets dormant. Meanwhile, the analog circuit modules will be in different operating modes due to different values of the bias current. The intelligent energy management module of the present invention may further classify bias conditions of the analog circuit modules according to the operating modes, to achieve the performance of a selfadaptive intelligent system. In the technology, the bias current is designed by employing more than one bias current source branch. Under an application condition where it is required to achieve low consumption, there is only one smallest bias current source input to the circuit module which is biased. In this case, the performance of the module is set into a lowest performance state which enables the module to operate. When the module is required to enter a high performance state, other bias current branches are connected into the module by the enabling signals, in order to achieve the expected high performance. A specific implementation is divided into the following several modules:

1. Adjustment of the Bias Current of the Regulated Power Supply in a Modulated State or in High Field Intensity Load modulation is performed on antennas of the passive radio frequency tag in the modulated state. The properly increased depth of modulation is helpful for the card reader terminal to receive and demodulate signals sent by the radio frequency tag. That is, the voltage of the antenna terminals presents obvious change in amplitude of peaks and volleys representative of information to be modulated. However, the significantly increased change in amplitude of peaks and volleys significantly influences the analog circuit modules with a limited power supply rejection ratio, wherein the performance of the power supply rejection ratio of the regulated power supply module is the most important. In this case, the voltage output by the regulated power supply has a greater ripple fluctuation than in other states, thereby influencing the electric performance of other modules. A loop bandwidth of an error amplifier, which is the key part of an error correction function in the regulated power supply, directly influences the output in the condition of greater ripple fluctuation. The greater the bandwidth is, the more stable the transient response is. The size of the bias current is linearly related to the loop bandwidth. Therefore, in this case, increasing the bias current to be a configuration of a plurality of branches for biasing by the enabling signals is conducive to improving the performance in this state. The same principle is applicable to a situation where the voltage ripple fluctuation on the antenna terminals is great in high field intensity. In this case, the bias current of the regulated power supply may be adjusted under the control by the intelligent energy management strategy, thus to meet the requirements on performance.

2. Adjustment of the Bias Current of the Demodulator Circuit in High Field Intensity In this technology, the size of the bias current of the demodulator circuit determines the modulation depth of correct demodulation. When the coupled field intensity is too high, an amplitude modulation signal in the demodulator is in an over-saturated state. That is, the demodulator circuit is unable to distinguish information represented by peaks and volleys, because in this case, even for valleys, the voltage thereof is greater than the limit that may be demodulated. Consequently, the difference will not be distinguished. In this case, the bias current may be properly adjusted into more than one bias branch which is then connected in parallel into the demodulator circuit module, so that at a same modulation depth, the range of the signal amplitude which may be adjusted by the demodulator is significantly increased.

3. Adjustment of the Current Bias of the Bandgap Reference Circuit in High Field Intensity As mentioned above, the voltage ripple fluctuation on the antenna terminals is great in high field intensity, which significantly influences the output of the bandgap reference voltage whose power supply rejection ratio is limited. That is, the bandgap reference output has ripple jitter. The power supply rejection ratio of the bandgap reference voltage generator module is also related to the bandwidth of the error amplifier in the bandgap reference circuit, and the bandwidth of the error amplifier is in turn directly related to the size of the bias current itself. Under an application condition of low field intensity, considering the sensitivity of the tag, the bias current is generally set as small as possible; under a condition of high field intensity, the energy is sufficient, and in this case, it is conducive to improving the transient performance of the bandgap reference voltage output by increasing the bias current of the error amplifier, so that the performance of the whole system may be ensured due to the stabilization of the bandgap reference voltage serving as the reference voltage.

The intelligent energy management of analog circuit modules by the intelligent energy management module will be described below in detail as embodiments of the present invention.

Embodiment 1

Control of the Demodulator Circuit Module

In addition to entering the dormant state in the modulated state, the demodulator circuit is kept in the normal operating state in the tag chip in order to receive instructions from the card reader. It can be known from the classification of energy levels implemented in the technology that, the demodulator circuit operates in the second energy level, which is slightly higher than that in the TTF mode where the tag responds initiatively. Hence, the enabling signal of the demodulator circuit module is determined by an anti-logic signal of the enabling signal of the modulation mode and judgment results of the second energy level.

Similarly, the ripple fluctuation, which may be resulted from further higher field intensity, may be compensated by adjusting the bias current of the demodulator circuit module. The compensation decision is made by both the anti-logic signal of the enabling signal of the modulation mode and the judgment results of the second energy level.

Embodiment 2

Control of the Regulated Power Supply Module of the System

After the system is powered on, before the energy level reaches the recovery level of the system, the regulated power supply module of the system is in the OFF state and thus there is no power consumption, in order to ensure that the system accumulates energy as soon as possible to enter the operating state.

After the system recovery, if the energy level output by the rectifier exceeds an operating voltage required by the rated digital logic control circuit module (which is judged by a system power-on and recovery circuit module), in order to ensure the reliability of transistors of the digital logic portion. The regulated power supply module of the system enters the operating state, that is, the enabling signal is set high, thereby ensuring that the regulated output voltage meets the requirements on the reliability, for example, 1.8V. If the energy level output by the rectifier does not reach this rated operating voltage, the regulated power supply module is in the "Bypass" state, that is, the rectified voltage directly powers the subsequent load circuits without being regulated.

In the normal operating state of the regulated power supply module, if the power supply voltage detection and judgment circuits indicate that the energy output by the rectifier is higher than the third energy level, i.e., 3.5V, the intelligent energy management strategy module outputs an instruction to increase the bias current of the regulated power supply module, and in this case, the regulated power supply has better power supply rejection ratio performance.

Embodiment 3

Control of the 2.0V Regulated Power Supply Module for Reading from EEPROM

A stable reading condition required to continuously read data from the EEPROM is to output 2.0V EEPROM reading-voltage regulated power. The enabling signal of the regulated power supply module is kept low when the regulated power supply module does not enter the reading state. After receiving a reading instruction, the output of judgment of the third energy level is examined in the system. If the output is logic high, the energy level received by the tag is sufficient to read from the EEPROM. Once the above two conditions are satisfied, that is, a reading instruction is received and the energy level is sufficient, the enabling signal of the 2.0V regulated power supply is set high, so that the 2.0V regulated power supply enters the operating state.

Similarly, the ripple fluctuation, which may be resulted from further higher field intensity, may be compensated by adjusting the bias current of the regulated power supply module. The compensation decision is made by both the state of reading from the EEPROM and judgment results of the fourth energy level.

Embodiment 4

Control of the Bandgap Reference Voltage Module

After the system is powered on, if the system enters the modulated state, the bandgap reference module is not required to operate, and the enabling signal of the bandgap reference voltage module is set low; or otherwise, the enabling signal is set high, so that it enters the normal operating state after the energy level reaches the power-on and recovery level.

In the normal operating state of the bandgap reference voltage, if results from the power supply voltage detection and judgment circuits indicate that the energy output by the rectifier is higher than the third energy level, i.e., 3.5V, the bias current of the bandgap reference voltage module enters the large bias current state, so that the output voltage has excellent power supply rejection ratio and transient response characteristic; or otherwise, the bias current is kept in the default bias state with low consumption.

Embodiment 5

Control of the Charge Pump Circuit Module

The charge pump and the high-frequency oscillator required by the charge pump are required only when performing initialized operations, such as erasing and programming, on the EEPROM. Control of the enabling signal of the charge pump is determined by the reception of an erasing instruction and judgment results of the fourth energy level.

Embodiment 6

Control of the Rectifier and Limiter Circuit Module

The level of the DC voltage output by the rectifier circuit module represents the level of receiving energy by the RFID tag chip, and is demodulated and controlled by the limiter circuit module. For y limiter discharge paths implemented in this technology, since the width-to-length ratio of the N-type MOS transistors of each discharge path is different from each other, the discharge ability of each discharge path is different from each other, and different levels of leakage states are realized by different combinations of opening and closing the N-type MOS transistors. Therefore, for y discharge paths connected in parallel, there may be total $2^y$ combinations of discharge paths, thereby controlling the discharge ability precisely. The larger the numerical value of y is, the more the combinations of the discharge paths are, the more the amplitude limiting and discharging points within an amplitude limiting voltage range are, and the higher the accuracy of amplitude limiting is. Based on the implementation of the intelligent energy management strategy, the accurate control of the limiter circuit may ensure the voltage-withstanding reliability of the transistors.

When the DC voltage output by the rectifier reaches the highest energy level, the output of the power supply voltage detection and judgment circuits in this energy level is high, the transistors on the chip face the challenge of reliability when driven by an excessive voltage. Hence, the first control output terminal of the intelligent energy management module may successively regulate the $2^y$ combinations of opening and closing, and accurately adjust the ability of the discharge paths until the output of the power supply voltage detection and judgment circuits in this energy level is low, thus to meet requirements on reliability.

Another objective of the embodiments of the present invention is to provide a passive radio frequency tag including this intelligent energy management system. For the passive radio frequency tag, the output terminal of the rectifier circuit is provided with the intelligent energy management module and x power supply voltage detection and judgment circuits, and the discharge path of the rectifier circuit is provided in parallel with y N-type MOS transistors having different width-to-length ratios. Since the x power supply voltage detection and judgment circuits have different amplitude limiting points, logic signals output by the power supply voltage detection and judgment circuit are also different from each other when the amount of charge between the first antenna terminal and the second antenna terminal is at different levels of energy due to change in the distance from the passive radio frequency tag to the card reader, and the intelligent energy management module detects the logic signal and thus obtains the level of charge of the tag. Meanwhile, the intelligent energy management module intelligently controls the operating state of the analog circuit module in each mode, by controlling the bias current source of each analog circuit module and the enabling/turn-off signal of the analog circuit module. For example, the bias current source of an analog circuit module required to be in the operating state is opened and then output into a predetermined value to bring the analog circuit module into the optimal operating state, or an appropriate bias current is input to an analog circuit module which is not necessary to operate to bring the analog circuit module into the dormant state or bring the bias current source into the OFF state; and meanwhile, an output signal of the analog circuit module is set to zero potential in order to bring the analog circuit module into the FULL-OFF state and thus to meet requirements on performances of low power consumption and high sensitivity.

Furthermore, the intelligent energy management module timely controls a discharge path, formed of y N-type MOS transistors having different width-to-length ratios connected in parallel, to conduct control on discharge of charge of the antenna terminals, so that the voltage-withstanding performance of devices connected to an inductance coil antenna is reliably ensured and the load circuit is prevented from being broken down by a too high voltage.

Figure 12:
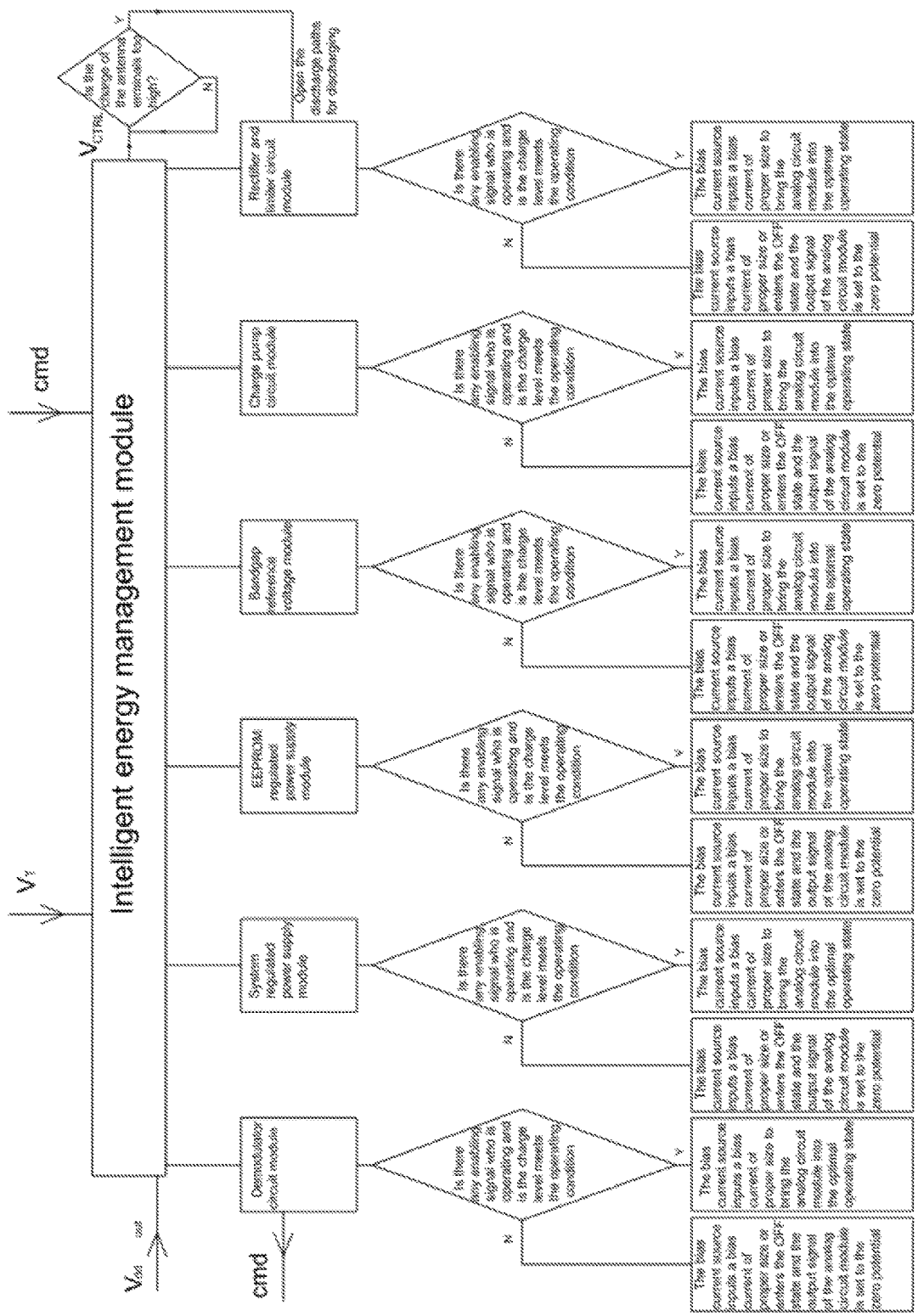
FIG. 12 is a flowchart of conducting intelligent energy management of a passive radio frequency tag according to the present invention.

Yet another objective of the present invention is to provide a method for conducting intelligent energy management of the passive radio frequency tag by the intelligent energy management system, and the flowchart of this method is as shown in FIG. 12. The method for conducting intelligent energy management includes the following steps:

a. by a resonant capacitor and a resonant inductor, receiving an external electromagnetic field and then coupling the external electromagnetic field to a rectifier circuit; and by the rectifier circuit, rectifying the AC power into DC power and respectively outputting the DC power to all analog circuit modules including a demodulator circuit and an intelligent energy management module and to the power input terminals of power supply voltage detection and judgment circuits;

b. by the at least two power supply voltage detection and judgment circuits, detecting the value of the DC power, where, since the power supply voltage detection and judgment circuits have different amplitude limiting points, logic signals output by the power supply voltage detection and judgment circuits are also different from each other when the DC power is in different values, and the intelligent energy management module detects the logic signal and thus obtains the level of charge of the tag;

c. by the demodulator circuit, demodulating a command signal of a card reader from antenna terminals and then inputting the command signal to the intelligent energy management module, thus to obtain the enabling state the tag is supposed to be in; and d. connecting the intelligent energy management module to a bias voltage source and an analog circuit module; when an instruction obtained by the intelligent energy management module from the card reader requires the analog circuit module (for example, a bandgap reference voltage module) to be in the operating state and the level of charge of the tag satisfies the operating voltage of the analog circuit module, by the intelligent energy management module, controlling the bias current source to input an appropriate bias current to the analog circuit module to bring the analog circuit module into the optimal operating state; when the instruction obtained by the intelligent energy management module from the card reader requires the analog circuit module to be in the dormant state, by the intelligent energy management module, controlling the bias current source to input an appropriate bias current to the analog circuit module to bring the analog circuit module into the dormant state or bring the bias current source into the OFF state; and meanwhile, setting an output signal of the analog circuit module to zero potential in order to bring the analog circuit module into the FULL-OFF state and thus to reduce the power consumption.

The intelligent energy management module conducts the intelligent energy management to the analog circuit modules by an energy management algorithm, to meet requirements on performances of low power consumption and high sensitivity.

The input condition of the energy management algorithm has two aspects: one aspect is the charge level of the tag detected by the power supply voltage detection and judgment circuits and received by the first control input terminal of the intelligent energy management module, i.e., a digital code representative of the field energy level received by the tag; and the other aspect is the enabling state which the tag should be in, parsed by the demodulator circuit and received by the second control input terminal of the intelligent energy management module, i.e., for example, a TTF mode, a command parsing mode, an EEPROM data reading mode and an EEPROM erasing and programming mode.

The output of the energy management algorithm has three aspects. One aspect is the control signal $V_{CTRL}$ of the first control output terminal of the intelligent energy management module to the discharge paths of the rectifier circuit, i.e., controlling the ON or OFF of the control input terminal of the discharge paths implemented in this technology to adjust the amplitude limiting points and the size of the discharge current, so that the system has an amplitude limiting starting point and an amplitude limiting degree in a suitable energy level in different modes, in order to improve the communication performance of the whole system; the second aspect is the adjustment control signal of the second control output terminal of the intelligent energy management module to the bias current source of each analog circuit module, i.e., to determined the bias current at which the bias is performed by the analog circuit module in various operating modes; and the third aspect is the enabling/turn-off control signals conducted by the third control output terminal of the intelligent energy management module to corresponding analog circuit modules, i.e., to bring the analog circuit modules which are operating into the optimal operating state, and bring the analog circuit modules which do not have to operate in this mode into the dormant state with low consumption or into the FULL-OFF state, thus to realize the low consumption and improve the sensitivity of the tag.

I claim:

1. An intelligent energy management system for a passive radio frequency tag, comprising:

a resonant capacitor, which is connected, between a first antenna terminal and a second antenna terminal, in parallel to a resonant inductor, and configured to form a resonant circuit together with the resonant inductor, receive an external electromagnetic field and couple the external electromagnetic field to a rectifier circuit;

the rectifier circuit, the first antenna terminal and the second antenna terminal of which is connected to a first antenna terminal and a second antenna terminal and configured to convert alternating current power, to which the resonant circuit is coupled, into direct current power; the first output terminal of which is output to all analog circuit modules including a demodulator circuit and an intelligent energy management module, a second output terminal of which is output to power supply voltage detection and judgment circuits and configured to provide a judgment voltage to the power supply voltage detection and judgment circuits, a third output terminal of which is grounded through at least two N-type MOS transistors connected in parallel to serve as a discharge path and configured to output charge to the ground when the field intensity is too high;

at least two power supply voltage detection and judgment circuits, a first power input detection terminal of which are connected to the second output terminal of the rectifier circuit, a second power input detection terminal of which are connected to the first control input terminal of the intelligent energy management module and configured to generate and then input a logic signal to the intelligent energy management module according to the amount of energy of coupling the first antenna terminal and the second antenna terminal;

a demodulator circuit, a power input demodulator terminal of which is connected to the first input terminal of the rectifier circuit, a control input terminal of which is connected between the first antenna terminal and the second antenna terminal, and the output terminal of which is connected to the second control input terminal of the intelligent energy management module and configured to demodulate and then input the enabling state of the tag to the intelligent energy management module according to a voltage signal across the resonant circuit; and an intelligent energy management module, a first power input management module terminal, a second power input management module terminal and a third power input management module terminal of which is connected to the first output terminal of the rectifier circuit, the first control input terminal of which is connected to the output terminals of the power supply voltage detection and judgment circuits, the second control input terminal of which is connected to the output terminal of the demodulator circuit, the first control output terminal of which is connected to the control input terminals of at least two discharge paths of the rectifier circuit and configured to control the discharge paths of the rectifier circuit to be opened or closed according to an amount of charge between the first antenna terminal and the second antenna terminal thus to realize controlling a leakage state of the output terminal, and the second control output terminal and the third control output terminal of which are respectively connected to a bias current source and an analog circuit module and configured to control the operating state of the analog circuit module by controlling the amount of a bias current input by the analog circuit module and an enabling/turn-off signal of the analog circuit module;

the rectifier circuit comprises a first rectifier branch, a second rectifier branch and a third rectifier branch, which are connected in parallel between the first antenna terminal and the second antenna terminal.

2. The intelligent energy management system for a passive radio frequency tag according to claim 1, characterized in that the second rectifier branch is a fifth diode and a sixth diode connected between the first antenna terminal and the second antenna terminal, or a fifth N-type MOS transistor and a sixth N-type MOS transistor connected between the first antenna terminal and the second antenna terminal;

the cathode terminals of the fifth diode and the sixth diode are connected to the power terminals of the power supply voltage detection and judgment circuits, and configured to provide a judgment voltage to the power supply voltage detection and judgment circuits;

the gate and drain of the fifth N-type MOS transistor are respectively connected to the first antenna terminal, the gate and drain of the sixth N-type MOS transistor are respectively connected to the second antenna terminal, and the source of the fifth N-type MOS transistor is connected to the source of the sixth N-type MOS transistor and output to the power input terminals of the power supply voltage detection and judgment circuits and configured to provide a judgment circuit to the power supply voltage detection and judgment circuits.

3. The intelligent energy management system for a passive radio frequency tag according to claim 1, characterized in that the third rectifier branch is a seventh diode and an eighth diode connected between the first antenna terminal and the second antenna terminal, or a seventh N-type MOS transistor and an eighth N-type MOS transistor connected between the first antenna terminal and the second antenna terminal;

the cathode terminals of the seventh diode and the eighth diode are connected to the drains of the at least two N-type MOS transistors connected in parallel, the gates of the at least two N-type MOS transistors connected in parallel are respectively connected to the control output terminal of the intelligent energy management module, and the source of each N-type MOS transistor is grounded and configured to output charge to the ground when the field intensity is too high; and the gate and drain of the seventh N-type MOS transistor are respectively connected to the first antenna terminal, the gate and drain of the eighth N-type MOS transistor are respectively connected to the second antenna terminal, the source of the seventh N-type MOS transistor is connected to the source of the eighth N-type MOS transistor and to the drains of the at least two N-type MOS transistors connected in parallel, the gates of the at least two N-type MOS transistors connected in parallel are respectively connected to the control output terminal of the intelligent energy management module, and the source of each N-type MOS transistor is grounded and configured to output charge to the ground when the field intensity is too high.

4. The intelligent energy management system for a passive radio frequency tag according to claim 1, characterized in that each of the power supply voltage detection and judgment circuits comprises a first divider unit, a second divider unit, a threshold comparator unit, a first limiter unit and a logic signal generator unit; and the first divider unit and the second divider unit are successively connected in series between a power terminal and a GND; the control terminal of the threshold comparator unit is connected between the first divider unit and the second divider unit, the input terminal thereof is connected to a current source through the first limiter unit and the output terminal thereof is grounded; the input terminal of the logic signal generator unit is connected between the input terminal of the threshold comparator unit and the first limiter unit, and configured to judge the amount of charge of the antenna terminals and input the charge to the first control input terminal of the intelligent energy management module.

5. The intelligent energy management system for a passive radio frequency tag according to claim 4, characterized in that the first divider unit is any one of at least one resistor, or at least one P-type MOS transistor, or at least one N-type MOS transistor;

among the at least one resistor, any resistor is in head-to-tail connection to an adjacent resistor to form a serial structure, the first resistor is connected to a power supply to serve as the input terminal of the first divider unit, and the last resistor is connected to the second divider unit to serve as the output terminal of the first divider unit;

among the at least one P-type MOS transistor, the drain terminal of any P-type MOS transistor is connected to the source terminal of an adjacent P-type MOS transistor to form a serial structure, the source of the first P-type MOS transistor is connected to the power supply to serve as the input terminal of the first divider unit, the drain of the last P-type MOS transistor is connected to the second divider unit to serve as the output terminal of the first divider unit, and the gate of each P-type MOS transistor is connected to the drain of the last P-type MOS transistor; and among the at least one N-type MOS transistor, the source terminal of any N-type MOS transistor is connected to the drain terminal of an adjacent N-type MOS transistor to form a serial structure, the drain of the first N-type MOS transistor is connected to the power supply to serve as the input terminal of the first divider unit, the source of the last N-type MOS transistor is connected to the second divider unit to serve as the output terminal of the first divider unit, and the gate of each N-type MOS transistor is connected to the drain of the first N-type MOS transistor.

6. The intelligent energy management system for a passive radio frequency tag according to claim 4, characterized in that the second divider unit is any one of at least one resistor, or at least one P-type MOS transistor, or at least one N-type MOS transistor;

among the at least one resistor, any resistor is in head-to-tail connection to an adjacent resistor to form a serial structure, the first resistor is connected to the first divider unit to serve as the input terminal of the second divider unit, and the last resistor is grounded to serve as the output terminal of the second divider unit;

among the at least one P-type MOS transistor, the drain terminal of any P-type MOS transistor is connected to the source terminal of an adjacent P-type MOS transistor to form a serial structure, the source of the first P-type MOS transistor is connected to the first divider unit to serve as the input terminal of the second divider unit, the drain of the last P-type MOS transistor is grounded to serve as the output terminal of the second divider unit, and the gate of each P-type MOS transistor is connected to the drain of the last P-type MOS transistor; and among the at least one N-type MOS transistor, the source terminal of any N-type MOS transistor is connected to the drain terminal of an adjacent N-type MOS transistor to form a serial structure, the drain of the first N-type MOS transistor is connected to the first divider unit to serve as the input terminal of the second divider unit, the source of the last N-type MOS transistor is grounded to serve as the output terminal of the second divider unit, and the gate of each N-type MOS transistor is connected to the drain of the first N-type MOS transistor.

7. The intelligent energy management system for a passive radio frequency tag according to claim 4, characterized in that the first limiter unit is any one of at least one resistor, or at least one P-type MOS transistor, or at least one N-type MOS transistor;

among the at least one resistor, any resistor is in head-to-tail connection to an adjacent resistor to form a serial structure, a first resistor is connected to the power supply to serve as the input terminal of the first limiter unit, and the last resistor is connected to the threshold comparator unit to serve as the output terminal of the first limiter unit;

among the at least one P-type MOS transistor, the drain terminal of any P-type MOS transistor is connected to the source terminal of an adjacent P-type MOS transistor to form a serial structure, the source of the first P-type MOS transistor is connected to the power supply to serve as the input terminal of the first limiter unit, the drain of the last P-type MOS transistor is connected to the threshold comparator unit to serve as the output terminal of the first limiter unit, and the gate of each P-type MOS transistor is connected to the drain of the last P-type MOS transistor;

among the at least one N-type MOS transistor, the source terminal of any N-type MOS transistor is connected to the drain terminal of an adjacent N-type MOS transistor to form a serial structure, the drain of the first N-type MOS transistor is connected to the power supply to serve as the input terminal of the first limiter unit, the source of the last N-type MOS transistor is connected to the threshold comparator unit to serve as the output terminal of the first limiter unit, and the gate of each N-type MOS transistor is connected to the drain of the first N-type MOS transistor.

8. The intelligent energy management system for a passive radio frequency tag according to claim 4, characterized in that the threshold comparator unit is at least one N-type MOS transistor, among the at least one N-type MOS transistor, the source terminal of any N-type MOS transistor is connected to the drain terminal of an adjacent N-type MOS transistor to form a serial structure, the drain of the first N-type MOS transistor is connected to the power supply source through the first limiter unit as the input terminal of the threshold comparator unit, the source of the last N-type MOS transistor is grounded as the output terminal of the threshold comparator unit, and the gate of each N-type MOS transistor is connected between the first divider unit and the second divider unit as the control terminal of the threshold comparator unit.

9. The intelligent energy management system for a passive radio frequency tag according to claim 4, characterized in that the logic signal generator unit is an odd number of inverters connected in series, the input stage of the first inverter is connected between the threshold comparator unit and the first limiter unit to serve as the input terminal of the logic signal generator unit, and the output stage of the last inverter is connected to the control input terminal of the intelligent energy management module and configured to generate and input a logic signal to the first control input terminal of the intelligent energy management module according to the amount of energy of coupling the antenna terminals.

10. A passive radio frequency tag, comprising the intelligent energy management module according to claim 1.

11. A method for conducting intelligent energy management of the passive radio frequency tag by the intelligent energy management system according to claim 1, comprising the following steps:

a. by a resonant capacitor and a resonant inductor, receiving an external electromagnetic field and then coupling the external electromagnetic field to a rectifier circuit; and by the rectifier circuit, rectifying the alternating current power into direct current power and respectively outputting the direct current power to all analog circuit modules including a demodulator circuit and an intelligent energy management module and to the power input terminals of power supply voltage detection and judgment circuits;

b. by the at least two power supply voltage detection and judgment circuits, detecting the value of the direct current power, where, since the power supply voltage detection and judgment circuits have different amplitude limiting points, logic signals output by the power supply voltage detection and judgment circuits are also different from each other when the direct current power is in different values, and the intelligent energy management module detects the logic signal and thus obtains the level of charge of the tag;

c. by the demodulator circuit, demodulating a command signal of a card reader from antenna terminals and then inputting the command signal to the intelligent energy management module, thus to obtain the enabling state the tag is supposed to be in; and d. connecting the intelligent energy management module to a bias voltage source and an analog circuit module; when an instruction obtained by the intelligent energy management module from the card reader requires the analog circuit module (for example, a bandgap reference voltage module) to be in the operating state and the level of charge of the tag satisfies the operating voltage of the analog circuit module, by the intelligent energy management module, controlling the bias current source to input an appropriate bias current to the analog circuit module to bring the analog circuit module into the optimal operating state; when the instruction obtained by the intelligent energy management module from the card reader requires the analog circuit module to be in the dormant state, by the intelligent energy management module, controlling the bias current source to input an appropriate bias current to the analog circuit module to bring the analog circuit module into the dormant state or bring the bias current source into the OFF state; and meanwhile, setting an output signal of the analog circuit module to zero potential in order to bring the analog circuit module into the FULL-OFF state and thus to reduce the power consumption;

the rectifier circuit comprises a first rectifier branch, a second rectifier branch and a third rectifier branch, which are connected in parallel between the first antenna terminal and the second antenna terminal.

* * * * *